United States Patent
Svevad

[11] Patent Number: 5,946,657
[45] Date of Patent: Aug. 31, 1999

[54] FOREVER BY MY SIDE ANCESTRAL COMPUTER PROGRAM

[76] Inventor: Lynn N. Svevad, 2260 Brighton St., Holland, Mich. 49424

[21] Appl. No.: 09/025,603

[22] Filed: Feb. 18, 1998

[51] Int. Cl.[6] .................................................. G09F 1/00
[52] U.S. Cl. .............................................. 704/275; 704/276
[58] Field of Search ..................................... 704/275, 276

[56] References Cited

U.S. PATENT DOCUMENTS

| | | | |
|---|---|---|---|
| 4,305,131 | 11/1981 | Best | 704/275 |
| 4,884,972 | 12/1989 | Gasper | 704/275 |
| 5,111,409 | 5/1992 | Gasper et al. | 704/275 |
| 5,357,596 | 10/1994 | Takebayashi et al. | |
| 5,559,927 | 9/1996 | Clynes. | |
| 5,577,165 | 11/1996 | Takebayashi et al. | |
| 5,613,056 | 3/1997 | Gasper et al. | 704/275 |
| 5,671,409 | 9/1997 | Fatseas et al. | |
| 5,671,555 | 9/1997 | Fernandes | 704/275 |
| 5,730,603 | 3/1998 | Harless | 704/275 |

*Primary Examiner*—David R. Hudspeth
*Assistant Examiner*—Daniel Abebe
*Attorney, Agent, or Firm*—Michael I. Kroll

[57] ABSTRACT

A method (110) of communicating by a user to a relative utilizing an ancestral computer program which comprises a computer having a CPU, operating system, display, speaker, microphone, sound card and storage means. The ancestral computer program is resident in the computer storage means consists of the following steps: A) first selecting (112) a relative; B) second selecting (114) a level of communication from a group consisting of basic, intermediate and advanced; C) activating (116) a virtual animation of the relative on the computer monitor; D) speaking (118) into the computer microphone by a user; E) translating (120) the user's words into a first spoken electronic format; F) relating (122) the first spoken electronic format to an appropriate relative's response; G) generating (124) an auditory output of the appropriate relatives response through the computer speaker; and H) repeating (126) steps (118) through (124) formulating a two way conversation between the user and the relative.

7 Claims, 4 Drawing Sheets

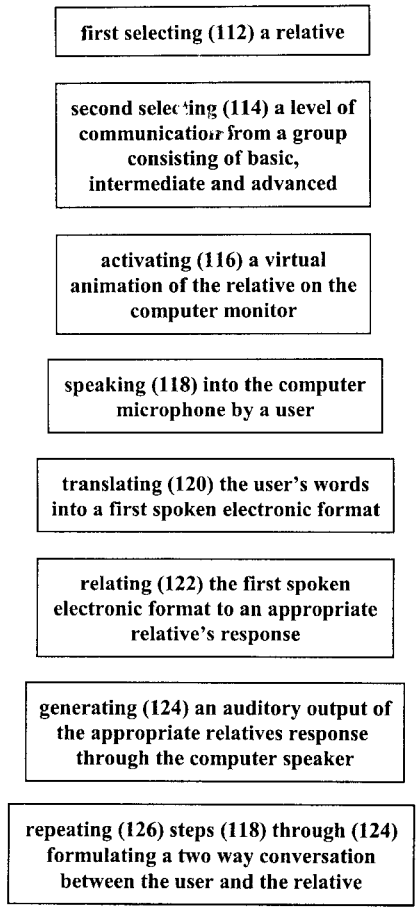

110

```
first selecting (112) a relative
```

```
second selecting (114) a level of
communication from a group
consisting of basic,
intermediate and advanced
```

```
activating (116) a virtual
animation of the relative on the
computer monitor
```

```
speaking (118) into the computer
microphone by a user
```

```
translating (120) the user's words
into a first spoken electronic format
```

```
relating (122) the first spoken
electronic format to an appropriate
relative's response
```

```
generating (124) an auditory output of
the appropriate relatives response
through the computer speaker
```

```
repeating (126) steps (118) through (124)
formulating a two way conversation
between the user and the relative
```

FIG. 1

110 correlating (126) the appropriate relatives response to a virtual animation of the relative first aging (128) the relative's virtual animation second aging (130) the relative's auditory output of the appropriate relative's response

--- first selecting (212) a special occasion which is prompted by a date in the computer operating system activating (214) a virtual animation of the relative on the computer monitor generating (216) an auditory output of an appropriate relative's greetings through the computer speaker responding (218) by speaking into the computer microphone by a user translating (220) the user's words into a first spoken electronic format relating (222) the first spoken electronic format to an appropriate relative's response generating (224) an auditory output of the appropriate relatives response through the computer speaker repeating (226) steps (218) through (224) formulating a two way conversation between the user and the relative

FIG. 3

110 correlating (226) the appropriate
relatives response to a virtual
animation of the relative first aging (228) the relative's
virtual animation second aging (230) the relative's
auditory output of the appropriate
relative's response

FIG. 4

FOREVER BY MY SIDE ANCESTRAL COMPUTER PROGRAM

BACKGROUND OF THE INVENTION

1. Field of the Invention

The present invention relates to a method of communicating by a user to a relative utilizing an ancestral computer program. More particularly, the present invention relates to an ancestral computer program which allows a living person to communicate with a deceased relative in an interactive virtual environment.

2. Description of the Prior Art

Computer programs range in scope from simple ancestral tree organization charts to virtual pets and interactive data entry to voice and voice to textural display. However, there are no computer programs which allow a user to have a two way conversation with another party such as a deceased relative.

Numerous innovations for computer programs are present in the prior art. the present invention relates to an ancestral to the present day computer program which allows a living person to communicate with a deceased relative, loved one or friend in an interactive virtual environment. Even though these innovations may be suitable for the specific individual purposes to which they address, they would not be suitable for the purposes of the present invention as heretofore described.

SUMMARY OF THE INVENTION

The present invention relates to an ancestral to the present day computer program which allows a living person to communicate with a deceased relative, loved one or friend in an interactive virtual environment. The essence of the present invention is to preserve the aura and image of a deceased individual. For instance, once a person dies, you can no longer pick up the telephone and call. The present invention is a computer program which resides in a storage means of a computer and has been encoded with the deceased person's personality, voice, image and mannerisms. The deceased person's image and/or voice can be aged accordingly with the actual age of the person. The present invention allows face to face conversations with a deceased loved one. The present invention has three different levels, basic, intermediate and advanced. The latter could automatically activate the ancestral computer program on special dates such as birthdays, anniversaries, Christmas, etc. The present invention is an interactive program capable of communication with the user in providing inspiration, insight and encouragement. It can help everyone of us at any age in dealing with issues of life and death. Especially alleviating grief and sadness in children.

The types of problems encountered in the prior art are they are limited in scope and functionality.

In the prior art, unsucessful attempts to solve this problem were attempted namely: ancestral trees and virtual pets. However, the problem was solved by the present invention because it is an interactive person to virtual person environment.

Innovations within the prior art are rapidly being exploited in the field of virtual reality.

The present invention went contrary to the teaching of the art which describes and claims ancestral organization charts and virtual pets.

The present invention solved a long felt need for an interactive person to person computer program.

The present invention produced unexpected results namely: loss of loved ones became an easier thing to accept.

A synergistic effect was produced utilizing the present invention due to the following facts and results from experimentation: children accepted the loss of a loved one with much less trauma.

Accordingly, it is an object of the present invention to provide a method of communicating by a user to a relative utilizing an ancestral computer program.

More particularly, it is an object of the present invention to provide a method of communicating by a relative to a user utilizing an ancestral computer program.

The novel features which are considered characteristic for the invention are set forth in the appended claims. The invention itself, however, both as to its construction and its method of operation, together with additional objects and advantages thereof, will be best understood from the following description of the specific embodiments when read and understood in connection with the accompanying drawings.

LIST OF REFERENCE NUMERALS UTILIZED IN THE DRAWINGS

First Embodiment

110—method (110) of communicating by a user to a relative utilizing an ancestral computer program 112—first selecting (112) a relative 114—second selecting (114) a level of communication from a group consisting of basic, intermediate and advanced 116—activating (116) a virtual animation of the relative on the computer monitor 118—speaking (118) into the computer microphone by a user 120—translating (120) the user's words into a first spoken electronic format 122—relating (122) the first spoken electronic format to an appropriate relative's response 124—generating (124) an auditory output of the appropriate relatives response through the computer speaker 126—repeating (126) steps (118) through (124) formulating a two way conversation between the user and the relative 126—correlating (126) the appropriate relatives response to a virtual animation of the relative 128—first aging (128) the relative's virtual animation 130—second aging (130) the relative's auditory output of the appropriate relative's response Second Embodiment 210—method (110) of communicating by a relative to a user utilizing an ancestral computer program 212—first selecting (212) a special occasion which is prompted by a date in the computer operating system 214—activating (214) a virtual animation of the relative on the computer monitor 216—generating (216) an auditory output of an appropriate relative's greetings through the computer speaker 218—responding (218) by speaking into the computer microphone by a user 220—translating (220) the user's words into a first spoken electronic format 222—relating (222) the first spoken electronic format to an appropriate relative's response 224—generating (224) an auditory output of the appropriate relatives response through the computer speaker 226—repeating (226) steps (218) through (224) formulating a two way conversation between the user and the relative 226—correlating (226) the appropriate relatives response to a virtual animation of the relative 228—first aging (228) the relative's virtual animation 230—second aging (230) the relative's auditory output of the appropriate relative's response

BRIEF DESCRIPTION OF THE DRAWINGS

FIG. 1 is a diagrammatic representation of a method (210) of communicating by a user to a relative utilizing an ancestral computer program.

FIG. 2 is a diagrammatic representation of a method (110) of communicating by a user to a relative utilizing an ancestral computer program.

FIG. 3 is a diagrammatic representation of a method (210) of communicating a relative to a user utilizing an ancestral computer program.

FIG. 4 is a diagrammatic representation of a method (210) of communicating a relative to a user utilizing an ancestral computer program.

DESCRIPTION OF THE PREFERRED EMBODIMENT

Firstly referring to FIG. 1 and FIG. 2 which are a diagrammatic representation of a method (210) of communicating by a user to a relative utilizing an ancestral computer program which comprises a computer having a CPU, operating system, display, speaker, microphone, sound card and storage means, the ancestral computer program is resident in the computer storage means consists of the following steps:

A) first selecting (112) a relative;

B) second selecting (114) a level of communication from a group consisting of basic, intermediate and advanced;

C) activating (116) a virtual animation of the relative on the computer monitor;

D) speaking (118) into the computer microphone by a user;

E) translating (120) the user's words into a first spoken electronic format;

F) relating (122) the first spoken electronic format to an appropriate relative's response;

G) generating (124) an auditory output of the appropriate relatives response through the computer speaker; and H) repeating (126) steps (118) through (124) formulating a two way conversation between the user and the relative.

The method (110) of communicating by a user to a relative utilizing an ancestral computer program as described further comprises the step of:

A) correlating (126) the appropriate relatives response to a virtual animation of the relative.

The method (110) of communicating by a user to a relative utilizing an ancestral computer program as described further comprises the step of:

A) first aging (128) the relative's virtual animation.

The method (110) of communicating by a user to a relative utilizing an ancestral computer program as described further comprises the step of:

A) second aging (130) the relative's auditory output of the appropriate relative's response.

Now referring to FIG. 3 and FIG. 4 which are a diagrammatic representation of a method (210) of communicating a relative to a user utilizing an ancestral computer program which comprises a computer having a CPU, operating system, display, speaker, microphone, sound card and storage means, the ancestral computer program is resident in the computer storage means consists of the following steps:

A) first selecting (212) a special occasion which is prompted by a date in the computer operating system;

B) activating (214) a virtual animation of the relative on the computer monitor;

C) generating (216) an auditory output of an appropriate relative's greetings through the computer speaker;

D) responding (218) by speaking into the computer microphone by a user;

E) translating (220) the user's words into a first spoken electronic format;

F) relating (222) the first spoken electronic format to an appropriate relative's response;

G) generating (224) an auditory output of the appropriate relatives response through the computer speaker; and H) repeating (226) steps (218) through (224) formulating a two way conversation between the user and the relative.

The method (210) of communicating by a relative to a user utilizing an ancestral computer program as described further consists of the following step:

A) correlating (226) the appropriate relatives response to a virtual animation of the relative.

The method (210) of communicating by a relative to a user utilizing an ancestral computer program as described further consists of the following step:

A) first aging (228) the relative's virtual animation.

The method (210) of communicating by a relative to a user utilizing an ancestral computer program as described further consists of the following step:

A) second aging (230) the relative's auditory output of the appropriate relative's response.

It will be understood that each of the elements described above, or two or more together, may also find a useful application in other types of constructions differing from the type described above.

While the invention has been illustrated and described as embodied in a computer program, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A method of a user communicating interactively with a deceased, actual person utilizing an ancestral computer program which comprises a computer having a CPU, operating system, display, speaker, microphone, sound card and storage means, the ancestral computer program being resident in the storage means, comprising the steps of:

a) storing information in said computer storage means about deceased relatives and friends, such information including personality, voice, image and mannerisms;

b) selecting a deceased relative or friend from among those stored in said storage system to communicate interactively with;

c) selecting a level of communication from a group consisting of basic, intermediate and advanced;

d) activating a virtual animation of said selected deceased relative or friend on said computer monitor;

e) speaking into the computer microphone by said user;

f) translating the user's words into a spoken electronic format;

g) relating said spoken electronic format to an appropriate response by said selected deceased relative or friend;

h) generating an auditory and visual output through the speaker and monitor, respectively, of the appropriate response of said selected deceased relative or friend;

i) repeating steps e) through h) formulating a two way conversation between the user and said selected deceased relative or friend.

2. The method of claim 1 in which the virtual animation of said selected deceased relative or friend is aged according to the actual age of said selected deceased relative or friend.

3. The method of claim 2 in which the auditory output of said selected deceased relative or friend is also aged according to the actual age of said selected deceased relative or friend.

4. A method of a user communicating interactively with a deceased, actual person utilizing an ancestral computer program which comprises a computer having a CPU, operating system, display, speaker, microphone, sound card and storage means, the ancestral computer program being resident in the storage means, comprising the steps of:

a) storing information in said computer storage means about deceased relatives and friends, said information including personality, voice, image, and mannerisms;

b) selecting a special occasion which is prompted by a date in the computer operating system;

c) activating a virtual animation of a deceased relative or friend for whom said special occasion is significant from said computer storage means to communicate interactively with;

d) generating an auditory output of an appropriate greeting from said deceased relative or friend through the computer speaker;

e) responding by speaking into the computer microphone by said user;

f) translating the user's words into a spoken electronic format;

g) relating said spoken electronic format to an appropriate response by said deceased relative or friend;

h) generating an auditory and visual output through the speaker and monitor, respectively, of the appropriate response by said deceased relative; and i) repeating steps e) through h) formulating a two way conversation between the user and deceased relative or friend.

5. The method of claim 4 in which the virtual animation of the deceased relative or friend is aged according to the actual age of said deceased relative or friend.

6. The method of claim 5 in which the auditory output of said deceased relative or friend is also aged according to the actual age of said deceased relative or friend.

7. The method of claim 4 in which said special occasion is the birthday of the said deceased relative or friend.

* * * * *